United States Patent [19]
Utsui et al.

[11] Patent Number: 5,131,281
[45] Date of Patent: Jul. 21, 1992

[54] STRAIN SENSING APPARATUS

[75] Inventors: Yoshihiko Utsui; Hiroshi Satoh, both of Amagasaki, Japan

[73] Assignee: Mitsubishi Denki Kabushiki Kaisha, Tokyo, Japan

[21] Appl. No.: 579,943

[22] Filed: Sep. 10, 1990

Related U.S. Application Data

[63] Continuation of Ser. No. 446,209, Dec. 5, 1989, abandoned.

[30] Foreign Application Priority Data

Dec. 6, 1988 [JP] Japan .................. 63-309217
Apr. 13, 1989 [JP] Japan .................. 1-93720

[51] Int. Cl.$^5$ .............................. G01L 3/10
[52] U.S. Cl. .................. 73/862.36; 324/209
[58] Field of Search ............. 73/862.36, DIG. 2; 324/209

[56] References Cited

U.S. PATENT DOCUMENTS 4,414,855 11/1983 Iwasaki .................. 73/862.36

FOREIGN PATENT DOCUMENTS 0173433 9/1985 Japan .................. 73/862.36
0298735 12/1987 Japan .................. 73/862.36

Primary Examiner—Charles A. Ruehl
Attorney, Agent, or Firm—Thomas R. Morrison; Paul Lerner

[57] ABSTRACT

A strain sensing apparatus includes a pair of magnetic layers disposed on a shaft to which an external force is applied to cause strain in it. The magnetic layers have magnetic permeabilities which change in opposite directions in response to the strain in the shaft. A sensing coil is disposed to face the magnetic layers with a spacing disposed between the coil and the magnetic layers. An exciting AC voltage is applied across the sensing coil. A change in self-inductance of the coil caused by the permeability changes of the magnetic layers due to the shaft strain is derived as an electrical signal representative of the magnitude of the shaft strain.

14 Claims, 11 Drawing Sheets

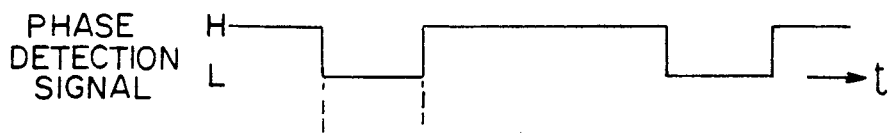
FIG. 13(a) PHASE DETECTION SIGNAL
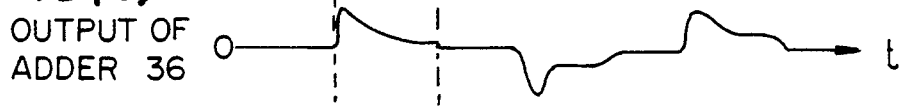
FIG. 13(b) OUTPUT OF ADDER 36
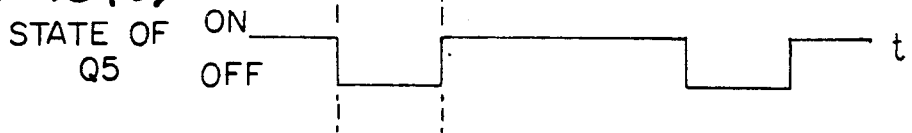
FIG. 13(c) STATE OF Q5
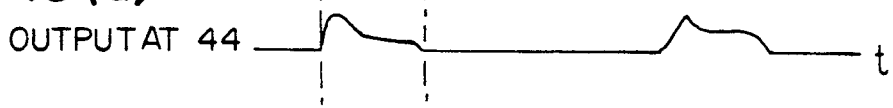
FIG. 13(d) OUTPUT AT 44
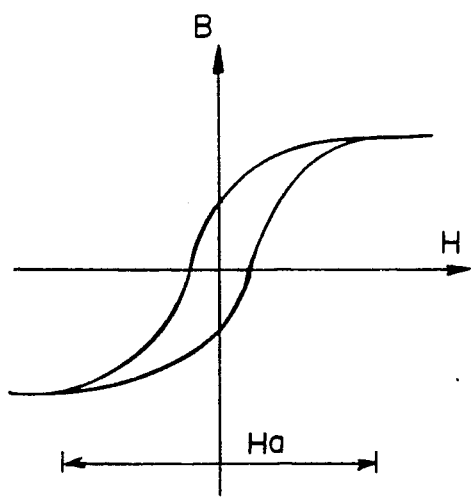
FIG. 14(a)
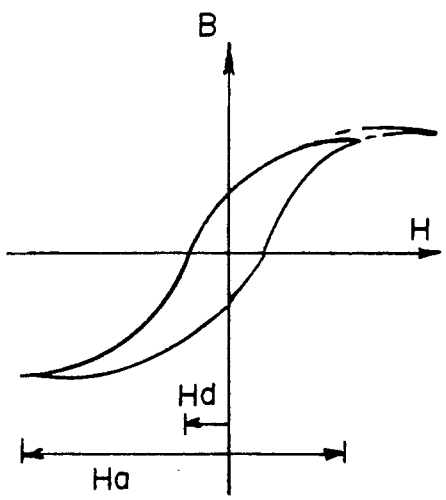
FIG. 14(b)

FIG. 20(a) EXCITING VOLTAGE
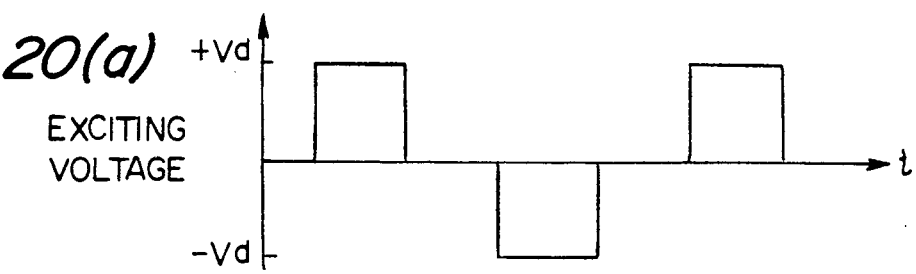
FIG. 20(b) OUTPUT OF CIRCUIT 36
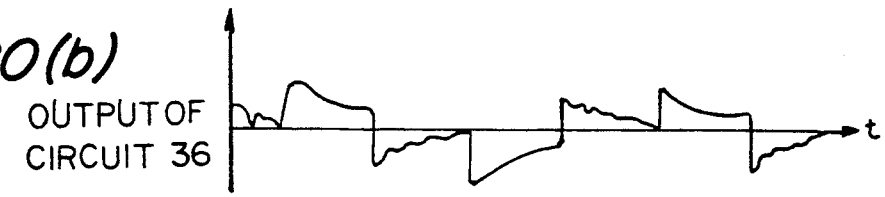
FIG. 20(c) FIRST PHASE DETECTION SIGNAL
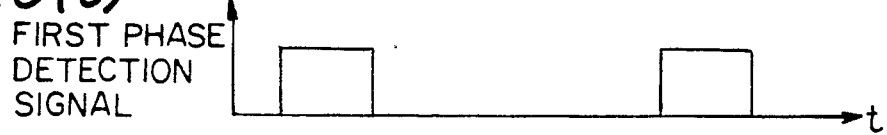
FIG. 20(d) SECOND PHASE DETECTION SIGNAL
FIG. 20(e) OUTPUT OF PHASE DETECTOR 58a
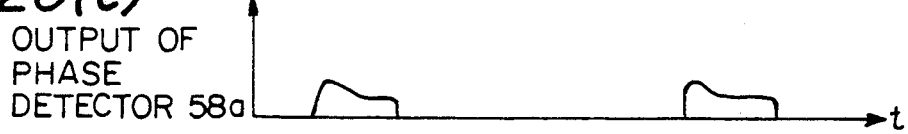
FIG. 20(f) OUTPUT OF PHASE DETECTOR 58b
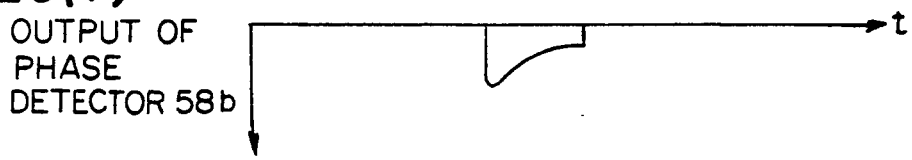
FIG. 20(g) OUTPUT OF DIFFERENTIAL AMPLIFIER 51
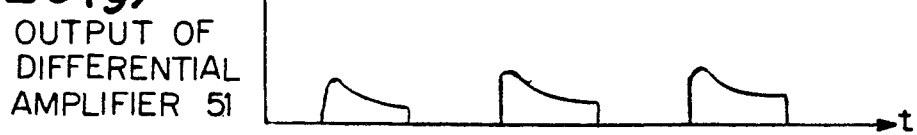

STRAIN SENSING APPARATUS

This is a continuation of co-pending application Ser. No. 446,209, filed on Dec. 5, 1989, now abandoned.

FIELD OF THE INVENTION

This invention relates to a strain sensing apparatus for sensing a strain in an elongated shaft, such as a rotating shaft. More particularly, this invention relates to such a strain sensing apparatus which includes two strain sensing magnetic layers disposed on a rotating shaft. The magnetic layers have magnetic permeabilities which vary in opposite directions when they are distorted. Variations in the permeabilities of the two magnetic layers are detected and an amount of strain of the rotating shaft is determined from the measured variations of the permeabilities of the two magnetic layers on the shaft.

BACKGROUND OF THE INVENTION

FIG. 1 shows an example of conventional strain sensing apparatus. This apparatus is shown in Japanese Published Patent Application No. SHO 59-188968. Referring to FIG. 1, magnetic layers 2a and 2b are fixed by, for example, bonding to a shaft 1 on which external force is exerted. It is assumed that the magnetic layer 2a has a magnetic anisotropy lying along +45°, while the magnetic layer 2b has a magnetic anisotropy lying along −45°. Cylindrical sensing coils 3a and 3b are disposed to face and surround the magnetic layers 2a and 2b, respectively, with a spacing provided therebetween. An exciting coil 4 common to the sensing coils 3a and 3b is disposed to surround the sensing coils 3a and 3b. The exciting coil 4 is driven with current supplied from a driving power supply 5. Output voltages of the sensing coils 3a and 3b are applied to smoothing circuits 6a and 6b, respectively. Output voltages of the smoothing circuits 6a and 6b are applied to a differential amplifier circuit 7 for differential amplification. An output voltage from the differential amplifier 7 is derived from an output terminal 8. This output voltage at the output terminal 8 is a strain representative signal which represents a magnitude of strain of the shaft 1.

The exciting coil 4 driven with current from the driving power supply 5 generates magnetic flux which passes through the magnetic layers 2a and 2b. A strain is generated in the shaft 1 in accordance with an external force applied to the shaft 1, and the permeabilities of the magnetic layers 2a and 2b change in opposite directions. Changes in the permeability of the magnetic layers 2a and 2b cause changes in the mutal inductance between the exciting coil 4 and the sensing coils 3a and 3b. This causes changes of the voltages induced in the respective sensing coils 3a and 3b. The changes of the induced voltages are smoothed in the respective smoothing circuits 6a and 6b and, then, differentially amplified in the differential amplifier circuit 7. The output voltage from the differential amplifier circuit 7 is developed at the output terminal 8 as a signal representative of a magnitude of strain of the shaft 1. From this output voltage, the amount of strain of the shaft 1 can be determined.

FIG. 2 shows another example of conventional strain sensing apparatus. The apparatus is shown in Japanese Published Patent Application No. SHO 59-166828. In FIG. 2, magnetic layers 12a and 12b are secured, by means of, for example, annular plated films 100, to a shaft 11 to which external force is exerted. Alternatively, the magnetic layers 12a and 12b may be bonded by an adhesive to the shaft 11. As in the case of the layers 2a and 2b of FIG. 1, the magnetic layers 12a and 12b have magnetic anisotropy lying along +45° and −45°, respectively. Cylindrical sensing coils 13a and 13b are disposed to face and surround the magnetic layers 12a and 12b. One terminal of each of the sensing coils 13a and 13b is connected to a voltage source $V_{cc}$. The other terminals of the coils 13a and 13b are connected to the collectors of transistors 25 and 26, respectively. The emitters of the transistors 25 and 26 are connected to output terminals 27a and 27b, respectively. The sensing coils 13a and 13b and the transistors 25 and 26, together with resistors 20-23, a variable resistor 24 and capacitors 18 and 19 form a multivibrator circuit. A capacitor 17 forms a smoothing circuit. The multivibrator circuit and the smoothing circuit form a magnetostriction sensing circuit 16.

The sensing coils 13a and 13b of the strain sensing apparatus of FIG. 2 are driven with current supplied from the driving voltage source $V_{cc}$ and, therefore, act also as exciting coils which generate magnetic fields. The variable resistor 24 is adjusted to provide such a value that when the shaft 11 has no strain, equal maximum collector currents (or emitter currents) $I_{C1}$ and $I_{C2}$ flow in the transistors 25 and 26 which are alternately turned on and off by the multivibrator action. Then, a voltage developed between the output terminals 27a and 27b is 0V. When a strain is generated in the shaft 11, the permeabilities of the magnetic layers 12a and 12b change. The directions of the permeability changes, however, are opposite to each other. The changes in the permeability of the magnetic layers 12a and 12b cause changes of the self-inductances of the sensing coils 13a and 13b, respectively. This breaks the equilibrium condition of the circuit, and the respective collector (or emitter) currents $I_{C1}$ and $I_{C2}$ and the duty cycle or oscillation frequency of the multivibrator circuit change. This, in turn, causes a DC voltage proportional to the magnitude of the strain of the shaft 11 to be developed across the smoothing capacitor 17 and, hence, between the output terminals 27a and 27b. From this DC voltage, the magnitude of the strain can be determined.

The conventional strain sensing apparatus shown in FIG. 1 has a disadvantage that since it uses two coil arrangements, namely, the sensing coils 3a, 3b and the exciting coil 4, fabrication and adjustment of the coils requires much time and, furthermore, wiring is also time-consuming.

The disadvantage of the apparatus of FIG. 1 can be eliminated in the conventional apparatus of FIG. 2. However, since the same circuit is used for both field generation and permeability sensing, it is difficult to adjust circuit parameters, such as an oscillation frequency and current values, to appropriate values. Furthermore, since the strain sensing apparatus of FIG. 2 can be effective only in the first quadrant of the B-H curve of the magnetic layers 12a and 12b, it can operate only on a portion of the B-H curve loop. Accordingly, the performance of the apparatus is much affected by a shift of the operating point which may be caused by disturbance fields. In other words, this apparatus is less resistant to external disturbance fields. Another disadvantage of this apparatus is that its sensitivity is low. These facts will be described in detail later with reference to FIGS. 3-7.

FIG. 3 shows a major portion of the multivibrator circuit of the strain sensing apparatus of FIG. 2. The same reference numerals as used in FIG. 2 designate the same items. The transistors 25 and 26 act as switching elements. The collector currents $I_{C1}$ and $I_{C2}$ of the transistors 25 and 26 flow only in one direction, varying as shown in FIG. 4. Since these currents $I_{C1}$ and $I_{C2}$ flow also through the sensing coils 13a and 13b, the operating range of the magnetic layers 12a and 12b is as indicated by a thick line $P_1$ in an operating field region $H_a$ of the B-H curve as shown in FIG. 5. The portion $P_1$ is along a loop lying somewhat inward of the major loop of the B-H curve and can be considered to be a minor loop of the B-H curve.

When a disturbance magnetic field $H_d > 0$ acts on the magnetic layers 12a and 12b, the operating magnetic field region $H_a$ shifts in the positive direction from the origin by $H_d$, as shown in FIG. 6, and, then, the operating range of the magnetic layers 12a and 12b becomes one indicated by thick lines $P_2$. If disturbance field $H_d$ acting on the layers 12a and 12b is less than O ($H_d < 0$), the f field acting on the layers 12a and 12b is $-H_d \sim (H_a - H_d)$ and the field operating region $H_a$ shifts toward the minus (−) region as shown in FIG. 7, so that the operating range becomes a minor loop represented by a thick line portion $P_1$, which is in the range of $H_a$.

As described above, although the apparatus of FIG. 2 is free of disadvantages of the apparatus of FIG. 1, it has a disadvantage that due to disturbance magnetic fields, its operating point changes greatly, which causes sensitivity reduction and offset variations.

Offset variation is a ratio of the magnitude of shift of the detection zero point of the sensor due to the presence of disturbance field, to the strain detecting sensitivity of the sensor in the absence of disturbance field, and can be defined by the following expression.

Offset
$$\text{Variation} = |V - V_{Hd=0}|/\text{Gain}_{Hd=0} \times 100(\%)$$

where V is the sensor output under a condition in which a disturbance magnetic field is present and no torque is applied to the shaft. $V_{Hd=0}$ is the sensor output under a condition in which no disturbance field is present and no torque is applied to the shaft, and $\text{Gain}_{Hd=0}$ is the distortion detecting sensitivity under a normal operating condition in which a magnetic field is not applied and torque is applied to the shaft.

The present invention can eliminate drawbacks present in conventional strain sensing apparatus, such as the ones described above. According to the present invention, a strain sensing apparatus is provided, in which driving parameters for sensing coils can be relatively freely set and which has a sensing characteristic that is highly stable against external disturbance magnetic fields.

SUMMARY OF THE INVENTION

According to a first embodiment of the present invention, a strain sensing apparatus comprises a pair of magnetic layers disposed on a shaft on which external force is exerted. The magnetic layers have magnetic permeabilities changing in opposite directions when a strain is generated in the shaft. The apparatus further includes cylindrical sensing coils disposed to surround respective ones of the magnetic layers with a spacing therebetween, an AC exciting circuit for applying an exciting AC voltage to the sensing coils, a pair of differential amplifier circuits for respectively detecting differences between a potential at the junction of the two sensing coils and potentials at the respective ends of the coils remote from the junction, an adder circuit for adding outputs from the respective differential amplifier circuits, and a phase detector circuit responsive to a phase detection signal provided by the AC exciting circuit for phase-detecting the output of the adder circuit.

A strain sensing apparatus according to a second embodiment of the present invention comprises a pair of magnetic layers disposed on a shaft on which external force is exerted. The magnetic layers have magnetic permeabilities changing in opposite directions when strain is generated in the shaft. The apparatus further includes cylindrical sensing coils disposed to surround respective ones of the magnetic layers with a spacing therebetween, an AC exciting circuit for applying an exciting AC voltage to the sensing coils, a first phase detector circuit for phase detecting the outputs of the sensing coils with a phase detection signal which is synchronized with positive-going portions of the exciting AC voltage from the AC exciting circuit, a second phase detector circuit for phase detecting the outputs of the sensing coils with a phase detection signal which is synchronized with negative-going portions of the exciting AC voltage from the AC exciting circuit, and a differential amplifier circuit for differentially amplifying the outputs of the first and second phase detector circuits.

Since the strain sensing apparatus according to the present invention uses only a pair of sensing coils and separate circuits are used for the magnetic excitation of the sensing coils and the sensing of the magnetic permeabilities of the magnetic layers, adjustment of circuit parameters, such as the driving frequency and the driving current, is facilitated. Thus, an improved operation characteristic is provided by means of a simple arrangement. Furthermore, since a driving current flows in both the positive and negative directions with large excursions, the operating magnetic field range is so large that the apparatus is less influenced by disturbance magnetic fields.

In the strain sensing apparatus according to the second embodiment, the outputs of the sensing coils are phase-detected with phase detection signals which are synchronized respectively with positive-going and negative-going portions of the exciting AC voltage from the AC exciting circuit, and the phase-detected outputs are differentially amplified. Consequently, any errors which could be contained in the respective phase-detected outputs are canceled, so that sensing precision is further improved. In particular, influence of shift of the magnetic field operating region due to disturbance magnetic fields is reduced, which further improves the disturbance field immunity of the apparatus.

BRIEF DESCRIPTION OF THE DRAWINGS

FIGS. 13(a)-13(d) illustrate various waveforms for use in explaining the operation of the phase detector circuit shown in FIG. 12;

FIGS. 14(a) and 14(b) show operating ranges on B-H curves of each magnetic layer of the strain sensing apparatus of the present invention shown in FIG. 8 in the presence and absence of a disturbance magnetic field, respectively.

FIGS. 20(a)-20(g) illustrate waveforms at various portions of the strain sensing apparatus of the present invention shown in FIG. 19 for use in explaining operation of the strain sensing apparatus of FIG. 19.

DETAILED DESCRIPTION OF THE PREFERRED EMBODIMENT

Now, the present invention is described in detail with reference to the drawings.

Figure 8:
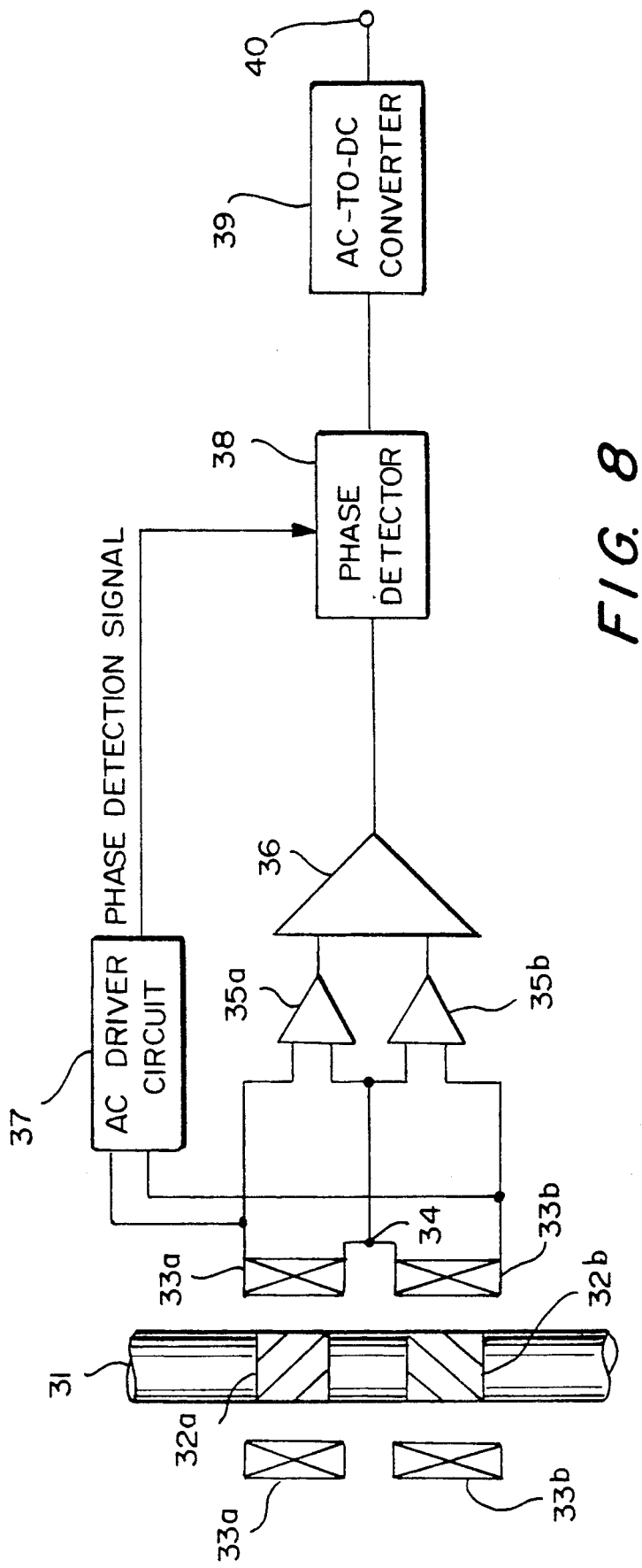
FIG. 8 shows a strain sensing apparatus according to a first embodiment of the present invention.

Referring to FIG. 8, magnetic layers 32a and 32b are secured by, for example, bonding to a shaft 31 on which external force is exerted. As in the aforementioned conventional strain sensing apparatus, it is assumed that the magnetic layer 32a has a magnetic anisotropy lying along +45°, while the layer 32b has a magnetic anisotropy lying along −45°. Surrounding the magnetic layers 32a and 32b, cylindrically wound sensing coils 33a and 33b are disposed with a spacing provided between the respective layers and the respective coils. The two sensing coils 33a and 33b are connected in series. The junction of the two sensing coils 33a and 33b forms an intermediate potential output terminal 34. Output voltages respectively developed across the sensing coils 33a and 33b, being referenced to a reference potential at the intermediate potential output terminal 34, are applied to associated ones of differential amplifier circuits 35a and 35b, respectively. An exciting AC voltage is applied across the series combination of the sensing coils 33a and 33b from an AC exciting circuit 37. The outputs of the differential amplifier circuits 35a and 35b are summed in an adder circuit 36, and the output voltage of the adder circuit 36 is applied to a phase detector circuit 38. The output voltage applied from the adder circuit 36 to the phase detector circuit 38 is phase detected with a phase-detection signal applied to the phase detector circuit 38 from the AC exciting circuit 37. A pulsating signal at the output of the phase detector circuit 38 is applied to an AC-to-DC converter circuit 39 which smooths and amplifies the pulsating signal to develop a signal representing the magnitude of strain of the shaft 1 at an output terminal 40.

Figure 9:
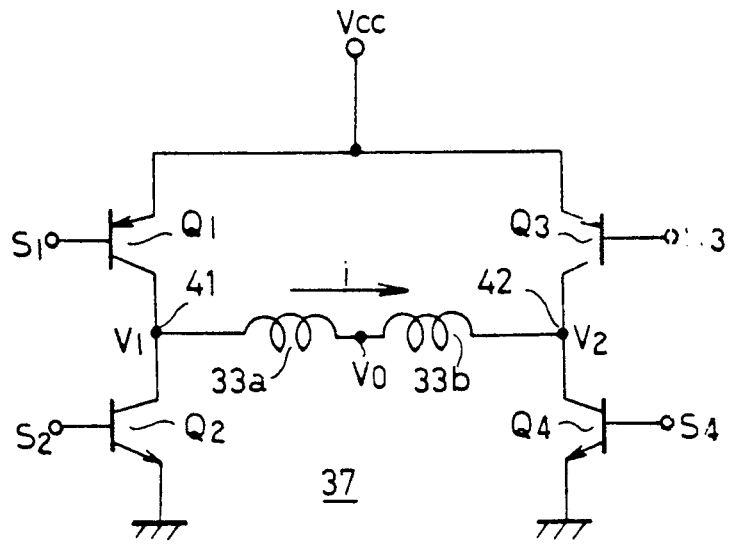
FIG. 9 shows an example of an AC exciting circuit which may be used in the strain sensing apparatus of the present invention shown in FIG. 8.

In FIG. 9, an example of the AC exciting circuit 37 is shown. The AC exciting circuit 37 shown in FIG. 9 comprises a series combination of a PNP transistor Q1 and an NPN transistor Q2 and a series combination of a PNP transistor Q3 and an NPN transistor Q4, both connected between a voltage source $V_{cc}$ and ground. The series combination of the sensing coils 33a and 33b is connected between the junction 41 of the transistors Q1 and Q2 and the junction 42 of the transistors Q3 and Q4. A signal generating circuit (not shown) applies timing signals $S_1$, $S_2$, $S_3$ and $S_4$ shown in FIG. 10 to the respective bases of the transistors Q1-Q4. In FIG. 9, $V_0$, $V_1$ and $V_2$ represent the intermediate reference potential at the junction of the sensing coils 33a and 33b, a potential at the junction 41 and a potential at the junction 42, respectively.

Figure 10:
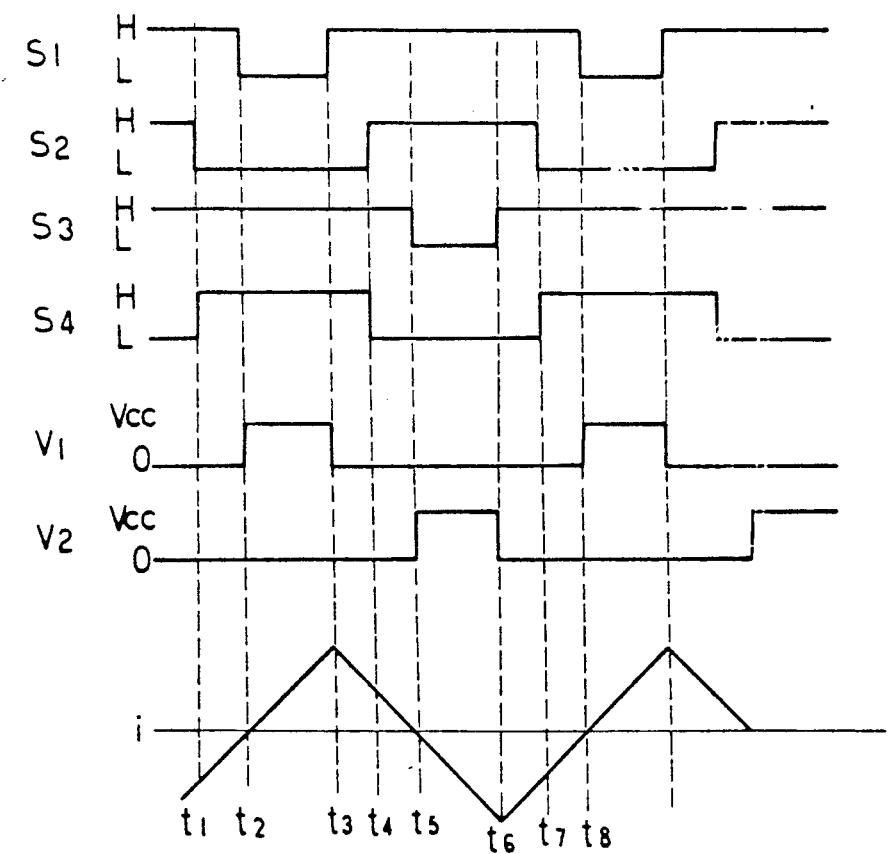
FIG. 10 illustrates waveforms at various points of the circuit shown in FIG. 9 for use in explaining the operation of the circuit of FIG. 9.

Referring now to FIG. 10 which is an operating timing chart useful for explaining operation of the apparatus of FIG. 8, during a time interval $t_2-t_3$ when the signals $S_1$ and $S_2$ are both L (i.e. at a low level) and the signals $S_3$ and $S_4$ are H (i.e. at a high level), the transistors Q1 and Q4 are conductive and the transistors Q2 and Q3 are nonconductive, and, consequently, $V_1=V_{cc}$ and $V_2=0$. Accordingly, gradually increasing current flows in the positive direction through the sensing coils 33a and 33b as indicated by an arrow i. During an interval $t_3-t_4$ during which the signal $S_1$ becomes H and the signal $S_4$ is still H, the transistor Q1 is nonconductive, but the transistor Q2 is forced into reverse conduction by the counterelectromotive force generated in the coils 33a and 33b, which causes gradually decreasing current to flow in the positive direction through a current path from the transistor Q2 through the coil 33a and the coil 33b to the transistor Q4.

During an interval $t_4-t_5$ during which the signals $S_1$, $S_2$ and $S_3$ are H and the signal $S_4$ is L, the transistor Q2 becomes conductive and the transistor Q3 is forced into reverse conduction by the counterelectromotive force generated in the sensing coils 33a and 33b, which causes further decreasing current to flow in the positive direction through a current path from the transistor Q2 through the coil 33a and the coil 33b to the transistor Q3.

During a time interval $t_5-t_6$ when the signals $S_1$ and $S_2$ are H and the signals $S_3$ and $S_4$ are L, the transistors Q2 and Q3 are conductive and the transistors Q1 and Q4 are nonconductive. Accordingly, gradually increasing current flows through the sensing coils 33a and 33b in the direction opposite to the direction indicated by the arrow i, i.e. in the negative direction.

During a time interval $t_6-t_7$ during which the signal $S_3$ becomes H and the signal $S_2$ is still H, the transistor Q4 is forced into reverse conduction by the counter-electromotive force generated in the sensing coils 33a and 33b, which causes gradually decreasing current to flow in the negative direction through a path extending from the transistor Q4 via the coil 33b and, then, the coil 33a to the transistor Q2.

During a time interval $t_7-t_8$ during which the signals $S_1$, $S_3$ and $S_4$ are H and the signal $S_2$ is L, the counter-electromotive force generated in the coils 33a and 33b forces the transistor Q1 into reverse conduction, whereby further decreasing current in the negative direction flows through the current path extending from the transistor Q4 through the coil 33b and the coil 33a to the transistor Q1.

Thus, the alternating current i shown in FIG. 10 flows through the sensing coils 33a and 33b.

Figure 11:
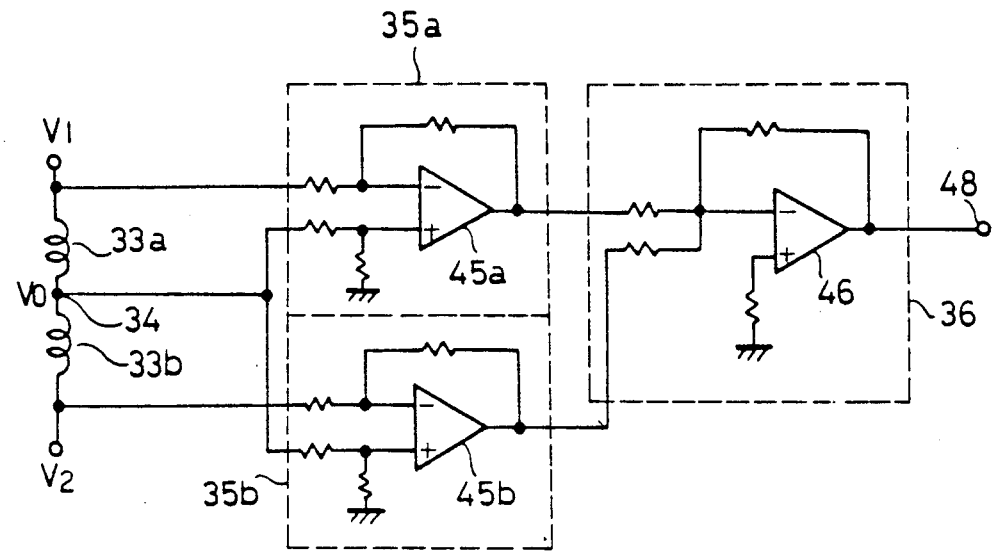
FIG. 11 is a circuit diagram of a first example of a differential amplifier and adder circuit arrangement which may be used in the strain sensing apparatus of the present invention shown in FIG. 8.

FIG. 11 shows a concrete example of the differential amplifier circuits 35a and 35b and the adder circuit 36 of the strain sensing apparatus of FIG. 8. Each of the circuits 35a, 35b and 36 comprises an operational amplifier 45a, 45b or 46 and resistors. The output 48 of the adder circuit 36 is connected to the phase detector circuit 38.

Figure 12:
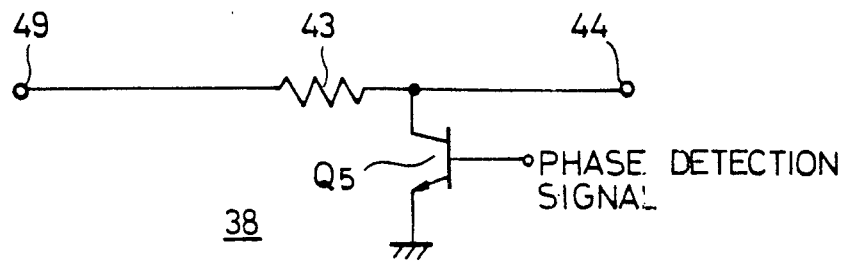
FIG. 12 is a circuit diagram of a first example of a phase detector circuit which may be used in the strain sensing apparatus of the present invention shown in FIG. 8.

FIG. 12 shows how the phase detector circuit 38 can be constructed. The phase detection signal from the AC exciting circuit 37 (FIG. 8) is applied to the base of a transistors Q5. An added signal from an output 48 of the adder circuit 36 is applied to an input terminal 49 of the phase detector circuit 38, and is applied through a resistor 43 to the collector of the transistor Q5 and to an output terminal 44 of the phase detector circuit 38.

FIGS. 13(a)–13(d) show an operating timing chart for the phase detector circuit 38. FIG. 13(a) shows a waveform of the phase detection signal which is applied to the base of the transistor Q5 from the AC exciting circuit 37. This phase detection signal has a given phase relation to an exciting AC signal applied to the coil 33a and 33b from the AC exciting circuit 37. FIG. 13(b) shows a waveform of the output of the adder circuit 36 which is applied to the phase detector circuit 38. FIG. 13(c) shows conduction states of the transistor Q5 which is turned on or off in synchronization with the phase detection signal applied to its base. When the phase detection signal is H, the transistor Q5 is in its ON state, and, consequently, the output of the adder circuit 36 does not appear at the output terminal 44. On the other hand, when the phase detection signal is L, the transistor Q5 is in its OFF state and, accordingly, the output of the adder circuit 36 is coupled, as it is, to the output terminal 44. FIG. 13(d) shows the waveform of the detector output signal appearing at the output terminal 44.

Next, operation of the strain sensing apparatus with the above-described arrangement is explained. When an external force, such as torque, is exerted on the shaft 31, a strain will be generated in the magnetic layers 32a and 32b, which causes changes in permeability of the magnetic layers in opposite directions. The AC exciting circuit 37 shown in FIG. 9 applied an alternating current such as i shown in FIG. 10 to the serially connected sensing coils 33a and 33b in response to the signals $S_1$–$S_4$ shown in FIG. 10. The changes in permeability of the magnetic layers 32a and 32b appear in the form of changes in self-inductance of the sensing coils 33a and 33b, which causes changes in voltage across each of the sensing coils 33a and 33b. The voltages across the respective coils 33a and 33b referenced to the potential $V_0$ at the intermediate potential output terminal 34 are applied to the differential amplifier circuits 35a and 35b, respectively, for differential amplification. The respective output signals of the differential amplifiers 35a and 35b are applied to and added in the adder circuit 36. The adder circuit output signal is then applied to the phase detector circuit 38, where it is phase-detected with the phase detection signal shown in FIG. 13(a) supplied from the AC exciting circuit 37 to thereby remove undesirable components, such as noise components. A pulsating signal produced by the phase detection is smoothed and amplified in the AC-to-DC converter circuit 39, and is developed at the output terminal 40 as a strain representative signal which represents the magnitude of the strain of the shaft 31.

As described above, the strain sensing apparatus according to the first embodiment of the present invention includes the AC exciting circuit 37 for exciting the sensing coils 33a and 33b. Sensing coil excitation and the sensing of the permeabilities of the magnetic layers 32a and 32b are performed by means of separate circuits. Accordingly, in comparison with conventional apparatus, such as the one shown in FIG. 2, adjustments of various operating parameters, such as the frequency and current value of the coil exciting signals, are facilitated. Furthermore, the temperature characteristic and the drift characteristic can be easily improved. Also, it is possible to provide a coil exciting current with large amplitudes in both positive and negative directions by the use of the AC exciting circuit 37, whereby the operating magnetic field region $H_a$ of apparatus can be wide, as shown in FIG. 14(a), relative to that of conventional apparatus, and the apparatus can operate on a major loop of the B-H curve. Then, even when an external disturbance field $H_d$ as shown, for example, in FIG. 14(b), is present, the influence of shifting of the operating point due to such a disturbance field is minimized and, therefore, permeability sensing error and noise influences are also minimized.

Figure 1:
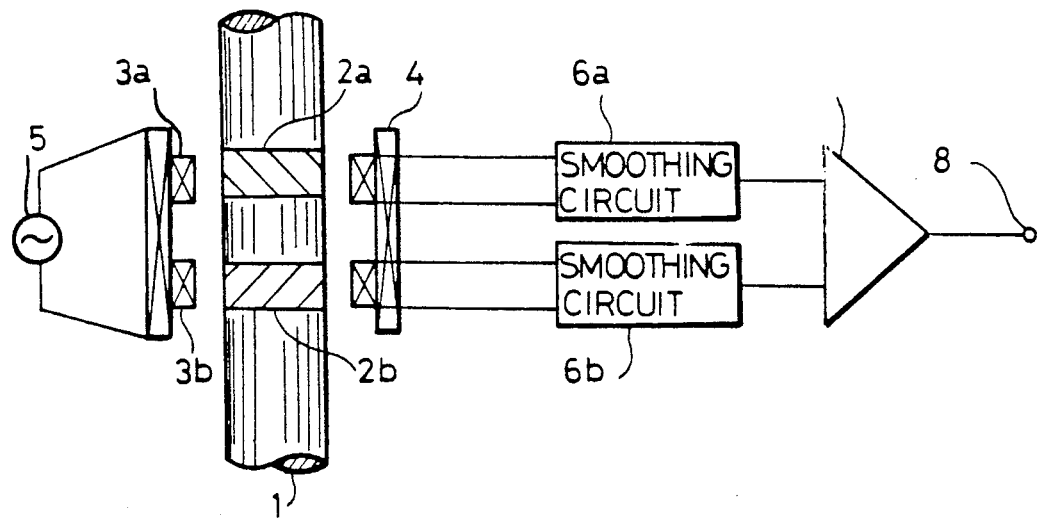
FIG. 1 shows a first example of conventional strain sensing apparatus.
Figure 2:
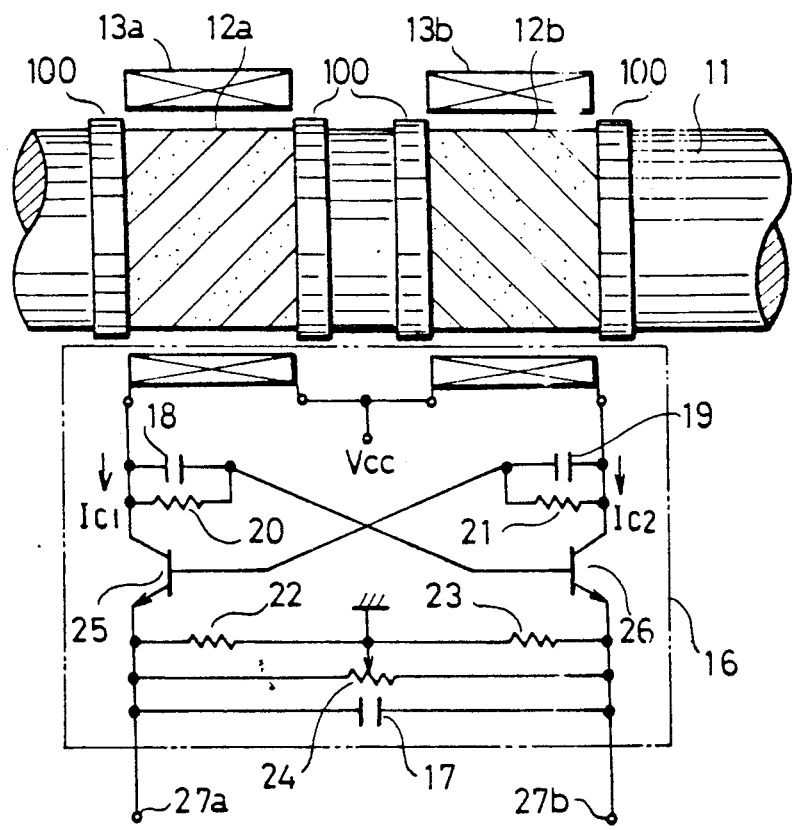
FIG. 2 shows a second example of conventional strain sensing apparatus.
Figure 3:
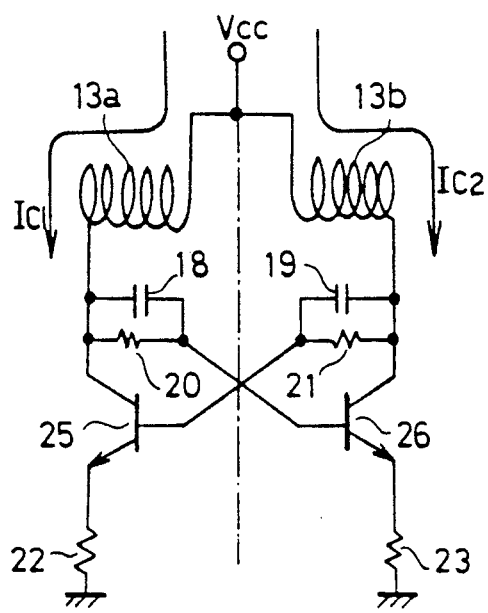
FIG. 3 is a circuit diagram for use in explaining operation of the strain sensing apparatus of FIG. 2.
Figure 4:
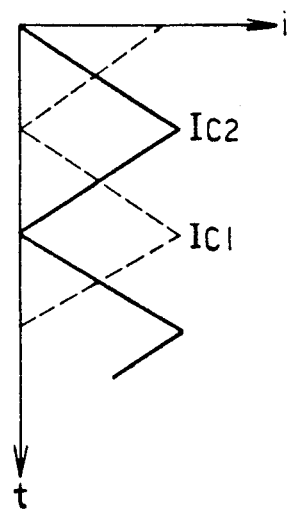
FIG. 4 shows variations of driving currents in the apparatus of FIG. 2.
Figure 5:
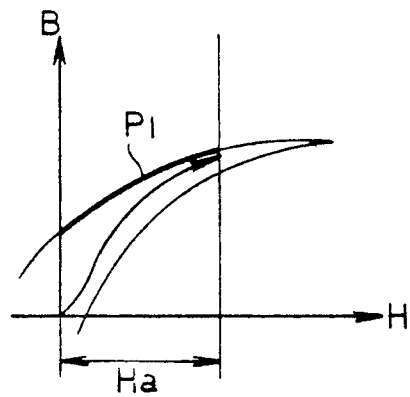
FIG. 5 illustrates an operating range on a B-H curve of magnetic layers of the apparatus of FIG. 2.
Figure 6:
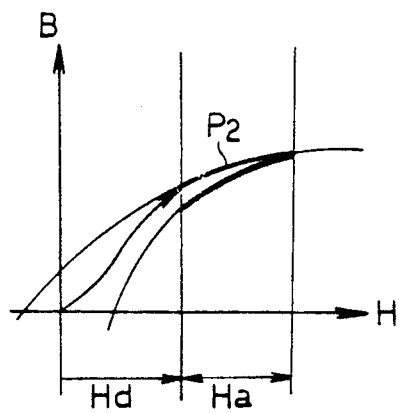
FIGS. 6 and 7 illustrate operating regions of the magnetic layers of the apparatus of FIG. 2 on B-H curves when disturbance magnetic fields are present.
Figure 7:
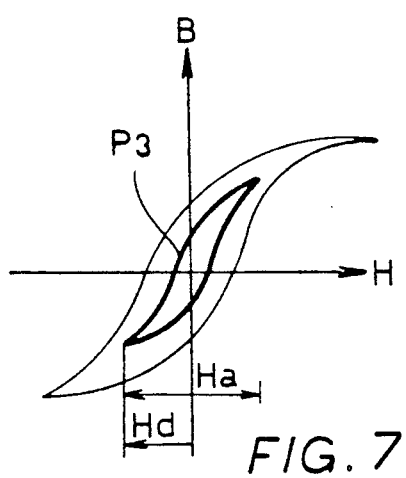
Figure 15:
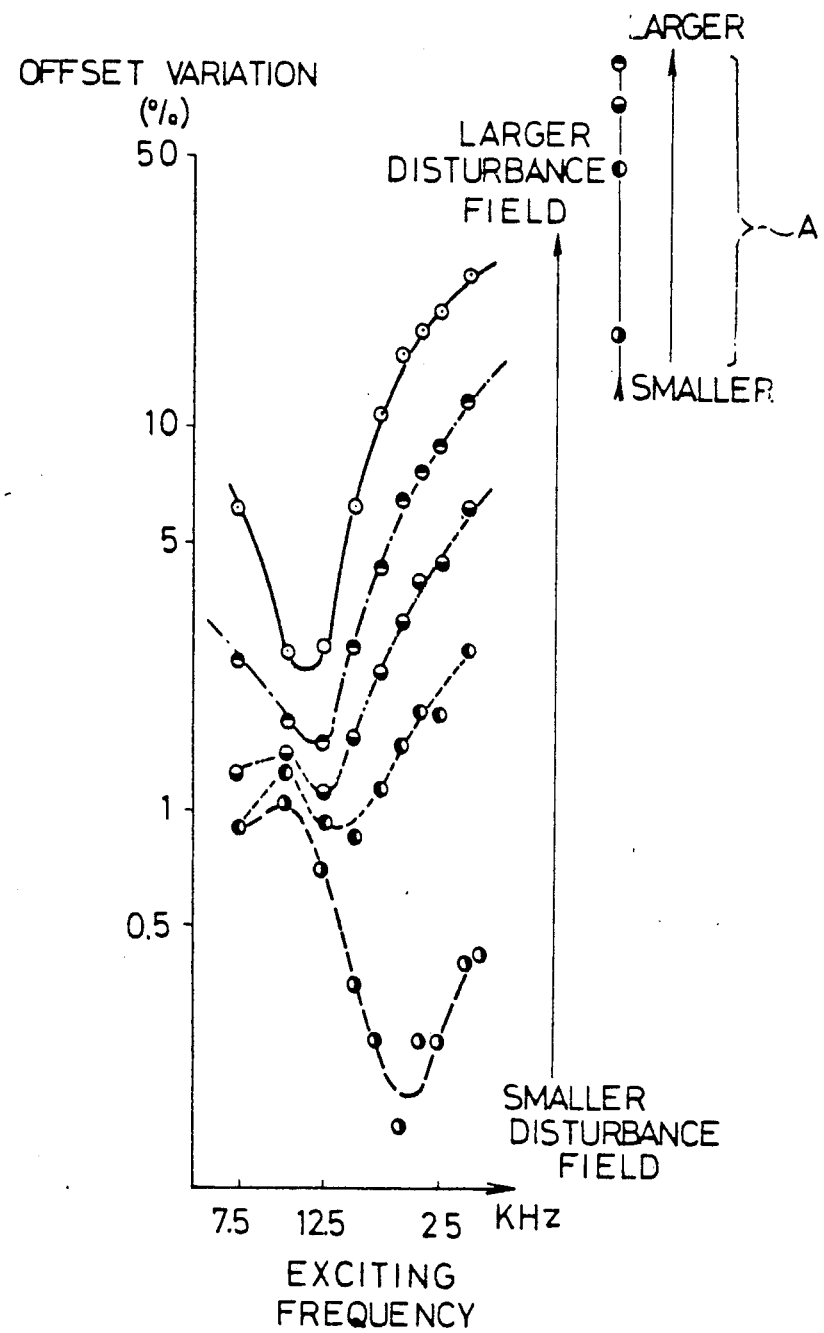
FIG. 15 shows relationships between a driving frequency and offset variation of the strain sensing apparatus of the present invention shown in FIG. 8 and a conventional strain sensing apparatus, in which a disturbance magnetic field is used as a parameter.

FIG. 15 shows the relation between the frequency of the signal exciting the coils 33a and 33b and offset variations of the strain-representative signal in the strain sensing apparatus of the present invention, with the magnitude of disturbance magnetic fields being used as a parameter. In FIG. 15, "A" represents the magnitude of offset variations in, for example, the conventional strain sensing apparatus shown in FIG. 2. In the apparatus of FIG. 2, when the magnitude of disturbance field changes, the offset variation is 10–100%. In contrast, it has been found that, according to the present invention, particularly in a range of the coil exciting frequencies of from 7.5 KHz to 25 KHz, offset variation is suppressed to less than several percent.

Figure 16:
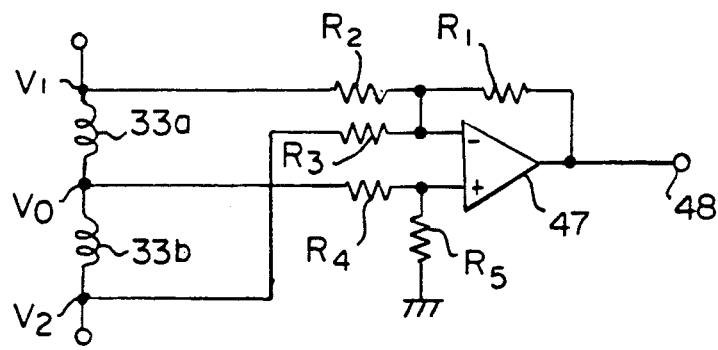
FIG. 16 is a circuit diagram of a second example of a differential amplifier and adder circuit arrangement which may be used in the strain sensing apparatus shown in FIG. 8.

FIG. 16 shows another example of a differential amplifier and adder circuit arrangement which may be used, in place of the arrangement of FIG. 11, in the strain sensing apparatus of the present invention shown in FIG. 8. This arrangement comprises one operational amplifier 47 and resistors $R_1 14$ $R_5$, and, therefore, simpler in structure than the arrangement of FIG. 11. In the arrangement shown in FIG. 16, the resistance values of the respective resistors are determined such that $R_2 = R_3 = R_1/d$ and $R_4 = R_5/2d$, where d is the differential amplification factor.

As above described, the strain sensing apparatus according to the first embodiment of the present invention shown in FIG. 8 has a small sensing error relative to conventional apparatus, and has stability against disturbance magnetic fields satisfactory for practical use. However, this strain sensing apparatus may have some problems when it is used in an application where higher sensing precision is required.

Figure 17A:
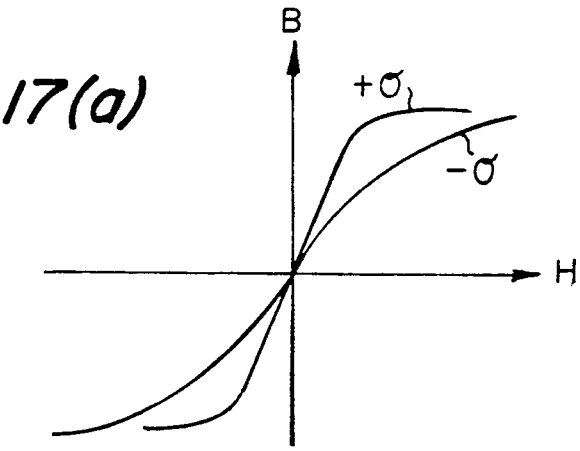
FIGS. 17(a) and 17(b) are for use in explaining influences created by a disturbance magnetic field on the strain sensing apparatus of FIG. 8, and FIGS. 17(a) and 17(b) show B-H and μ-H characteristic curves of the magnetic layers, respectively, and FIG. 17(b) also shows magnetic fields applied to the magnetic layers when a disturbance magnetic field is present or absent.
Figure 17B:
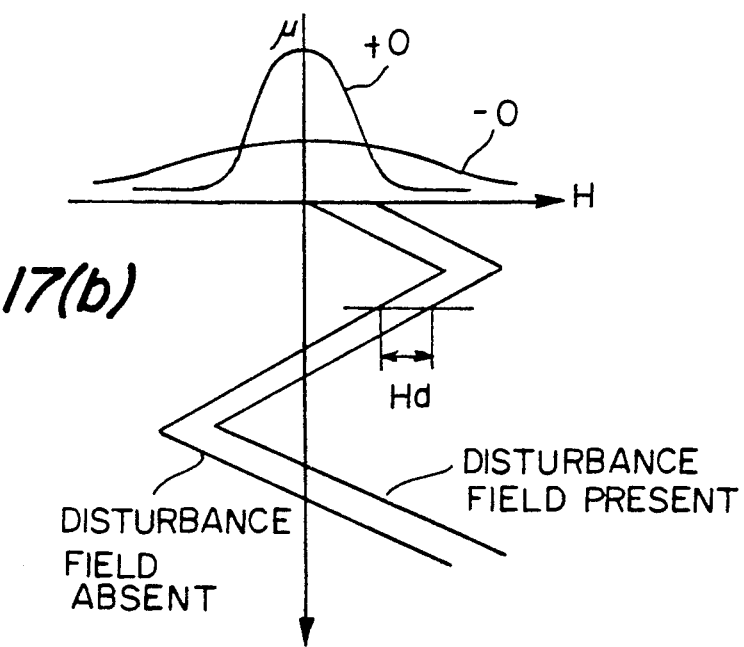
Figure 18A:
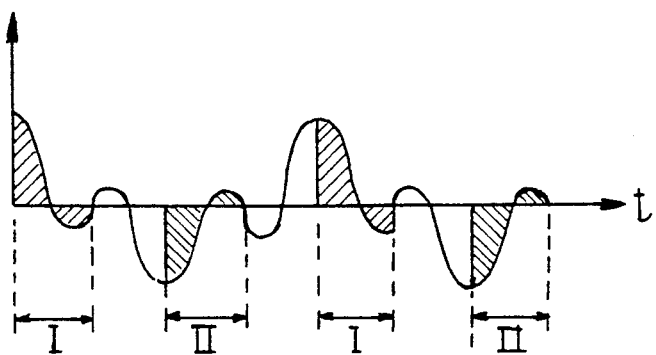
FIGS. 18(a) and 18(b) illustrate the relationship between the output of the adder circuit and the timing of detection in the strain sensing apparatus of FIG. 8 in the presence and absence of a disturbance magnetic field, respectively.
Figure 18B:
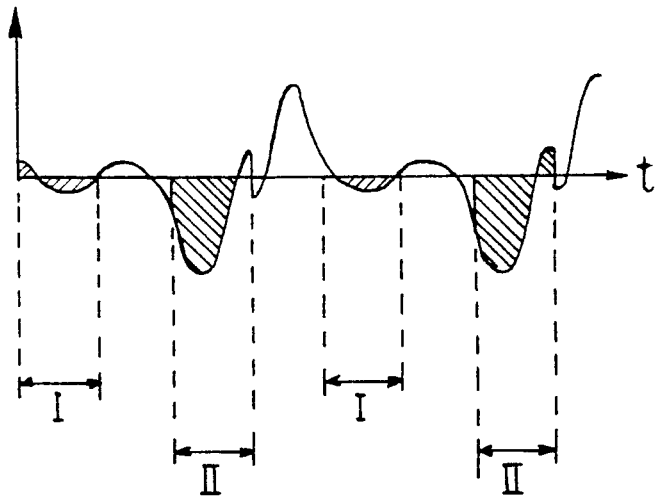

FIG. 17(a) shows B-H characteristic curves of the magnetic layers 32a and 32b when external force is exerted on the shaft 1 of the apparatus shown in FIG 8. When the characteristic of one magnetic layer 32a is $+\sigma$, that of the other layer 32b is $-\sigma$. These B-H characteristic curves may be transformed into $\mu$-H characteristic curves which are shown in FIG. 17(b). The magnetic field applied to the magnetic layers 32a and 32b when a disturbance field is present is different from the magnetic field in the absence of a disturbance field, as shown in FIG. 17(b). FIG. 18(a) shows a waveform of the output of the adder circuit 36 when a disturbance field is absent, and FIG. 18(b) shows a waveform when a disturbance field is present. In FIGS. 18(a) and 18(b), "I" and "II" indicate times at which the phase detection takes place and which are in synchronization with the positive-going and negative-going portions, respectively, of the exciting signal supplied from the AC exciting circuit 37. Hatched portions of the waveforms shown in FIGS. 18(a) and 18(b) represent detector outputs at those times. In the embodiment shown in FIG. 8, detection takes place with timing corresponding to either one of the positive-going and negative-going portions of the exciting signal from the AC exciting circuit 37 or with either timing I or II. Consequently, if a disturbance field acts on the magnetic layers, the detector output may contain error components as is seen from FIG. 18(b). The error becomes larger particularly when the operating range moves because of a disturbance field. Thus, the sensing sensitivity and stability against disturbance fields may be more or less insufficient in some situations.

Figure 19:
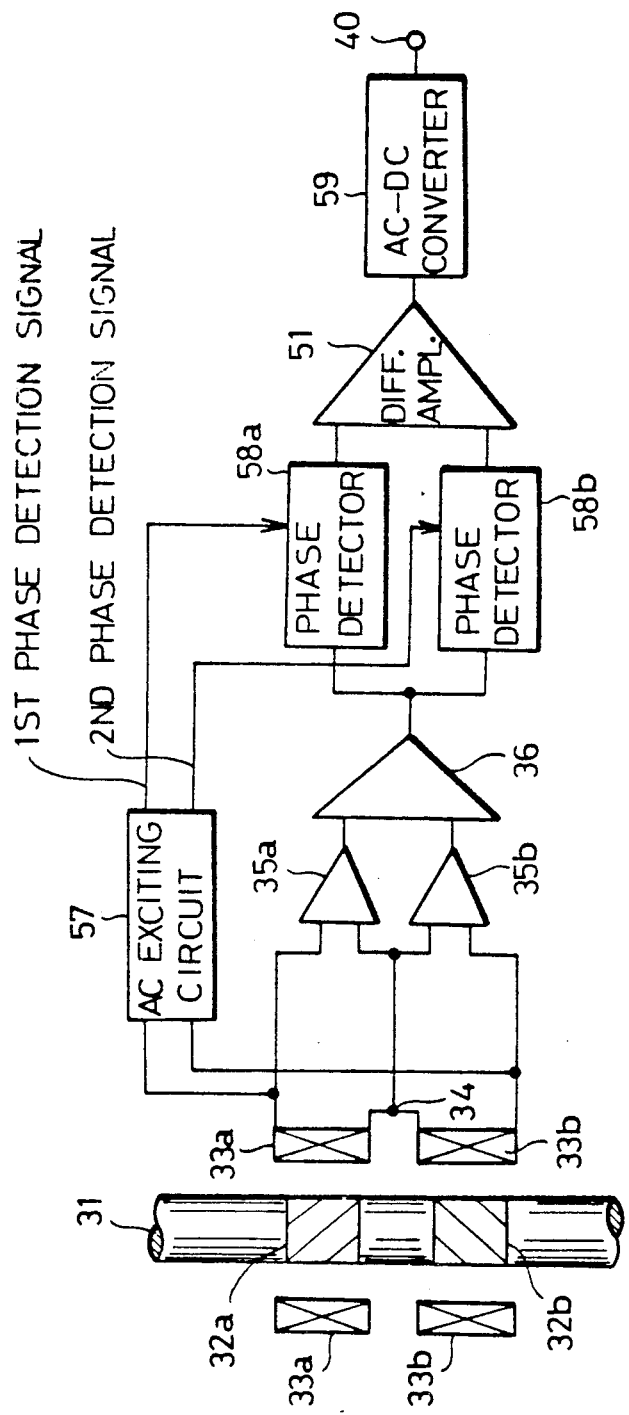
FIG. 19 shows a strain sensing apparatus according to a second embodiment of of the present invention.

In a second embodiment of the strain sensing apparatus of the present invention shown in FIG. 19, two phase detection signals which are in synchronization respectively with positive-going and negative-going portions of an exciting signal supplied from the AC exciting circuit are used for phase detecting the output of the adder circuit, and the phase detected signals are then applied to a differential amplifier for differential amplification. This apparatus is highly stable against noise and disturbance magnetic fields. In FIG. 19, components with the same reference numerals as in FIG. 8 are the same as the components with those reference numerals shown in FIG. 8, and, therefore, explanation thereof is not made.

In FIG. 19, the output signal of the adder circuit 36 is applied to first and second phase detector circuits 58a and 58b. The first phase detector circuit 58a phase-detects the output signal of the adder circuit 36 with a first phase detection signal which is synchronized with the positive-going portions of the exciting signal generated in an AC exciting circuit 57. The second phase detector circuit 58b phase-detects the output signal of the adder circuit 36 with a second phase detection signal which is synchronized with the negative-going portion of the exciting signal generated in the AC exciting circuit 57. The respective outputs of the phase detector circuits 58a and 58b are applied to a differential circuit 51 for differential amplification, and the output of the differential amplifier circuit 51 is applied to the AC-to-DC converter circuit 59.

Next, operation of the strain sensing apparatus of FIG. 19 is described with reference to timing waveforms shown in FIG.

The AC exciting circuit 57 generates a coil exciting voltage having positive-going and negative-going portions as shown in FIG. 20(a). This exciting voltage is applied to the sensing coils 33a and 33b. The adder circuit 36 provides a strain component shown in FIG. 20(b), which represents a strain of the shaft 1. The AC exciting circuit 57 also supplies the first phase detector circuit 58a with a first phase detection signal shown in FIG. 20(c) which is in synchronization with the positive-going portions of the exciting voltage of FIG. 20(a), and supplies the second phase detector circuit 58b with a second phase detection signal shown in FIG. 20(d) which is in synchronization with the negative-going portions of the exciting voltage shown in FIG. 20(a). In response to the first and second phase detection signals shown in FIGS. 20(c) and 20(d), the first and second phase detector circuits 58a and 58b generate output signals shown in FIGS. 20(e) and 20(f), respectively. These two detector output signals are applied to the differential amplifier circuit 51, which results in an output signal shown in FIG. 20(g) at the output of the circuit 51. The output signal of the circuit 51 is smoothed and amplified in the AC-to-DC converter circuit 59 and, then, is developed as a strain representative signal at the output terminal 40.

In the strain sensing apparatus according to the second embodiment of the present invention shown in FIG. 19, the adder circuit output is phase detected in the two phase detectors in synchronization with the positive-going and negative-going portions of the exciting voltage applied from the AC exciting circuit 57 to the coils, and the outputs of the two detectors are then differentially amplified in the differential amplifier 51 so that error components are cancelled. Thus, the apparatus can detect the strain of the shaft with higher precision. In particular, when the operating range is moved due to a disturbance magnetic field, error components are contained in the respective phase detector outputs, but they are cancelled by the later-stage differential amplification in the differential amplifier circuit 51. Thus, the apparatus of FIG. 19 is more stable against external disturbance magnetic fields.

The first and second embodiments have been described to use the two sensing coils (33a, 33b) for respective ones of the magnetic layers (32a, 32b). However, a single sensing coil may be used in common to the two magnetic layers. In such a case, the intermediate potential output terminal is provided at the intermediate point on the coil.

What is claimed is:

1. A strain sensing apparatus for sensing strain in a shaft which is subject to the application of external forces, said apparatus comprising:
   a pair of magnetic layers mountable on said shaft, said magnetic layers being such that their magnetic permeabilities will change in opposite directions in response to a strain generated in said shaft;
   a sensing coil disposed in spaced, facing relation to said magnetic layers;
   an AC exciting circuit for applying an AC exciting voltage across said sensing coil;

a pair of differential amplifier circuits for sensing the voltage differences between the mid point and the two ends of said sensing coil;

an adder circuit for summing the outputs from said differential amplifier circuits; and a phase detector circuit for phase detecting the output of said adder circuit, said phase detector circuit using a phase detection signal generated in synchronization with said AC exciting voltage.

2. A strain sensing apparatus according to claim 1 wherein one of said magnetic layers has a magnetic anisotropy lying along +45°, and the other of said magnetic layers has a magnetic anisotropy lying along −45°.

3. A strain sensing apparatus according to claim 1 wherein said sensing coil comprises a pair of separate sensing coil portions which are disposed to face the respective ones of said magnetic layers with a spacing disposed therebetween, said pair of coil portions being connected in series with each other; and said exciting AC voltage is applied across the series combination of said coil portions.

4. A strain sensing apparatus according to claim 1 wherein said sensing coil comprises a single, common sensing coil which is disposed to face said magnetic layers with a spacing disposed therebetween; an output terminal for deriving said intermediate potential is disposed at the mid point on said common sensing coil; and said exciting AC voltage is applied across said common sensing coil.

5. A strain sensing apparatus according to claim 1 wherein said shaft is a driven shaft to which external torque is applied.

6. A strain sensing apparatus according to claim 1 wherein the output of said phase detector circuit is converted to DC in an AC-to-DC converter circuit to develop an output signal representative of the magnitude of strain in said shaft.

7. A strain sensing apparatus according to claim 1 wherein said exciting AC voltage has a frequency within a range of from 7.5 KHz to 25 KHz.

8. A strain sensing apparatus according to claim 1, wherein said phase detection signal is generated by said AC exciting circuit.

9. A strain sensing apparatus for sensing strain in a shaft which is subject to application of external forces, said apparatus comprising:

a pair of magnetic layers mountable on said shaft, said magnetic layers being such that their magnetic permeabilities will change in opposite directions in response to a strain generated in said shaft;

a sensing coil disposed in spaced, facing relation to said magnetic layers;

an AC exciting circuit for applying an AC exciting voltage across said sensing coil;

a first phase detector for phase detecting the output of said sensing coil, using a phase detection signal which is in synchronization with positive-going portions of said AC exciting voltage of said AC exciting circuit;

a second phase detector circuit for phase detecting said output of said sensing coil, using a phase detection signal which is in synchronization with negative-going portions of said AC exciting voltage of said AC exciting circuit; and a differential amplifier circuit for differentially amplifying the outputs of said first and second phase detector circuits.

10. A strain sensing apparatus according to claim 9 wherein one of said magnetic layers has a magnetic anisotropy lying along +45°, and the other of said magnetic layers has a magnetic anisotropy lying along −45°.

11. A strain sensing apparatus according to claim 9 wherein said sensing coil comprises a pair of separate sensing coil portions which are disposed to face the respective ones of said magnetic layers with a spacing disposed therebetween, said pair of coil portions being connected in series with each other; and said exciting AC voltage is applied across the series combination of said coil portions.

12. A strain sensing apparatus according to claim 9 wherein said shaft is a driven shaft to which external torque is applied.

13. A strain sensing apparatus according to claim 9 wherein the output of said differential amplifier circuit is converted to DC in an AC-to-DC converter circuit to develop an output signal representative of the magnitude of strain in said shaft.

14. A strain sensing apparatus for sensing strain in a shaft which is subject to application of external forces, said apparatus comprising:

a pair of magnetic layers mountable on said shaft, said magnetic layers being such that their magnetic permeabilities will change in opposite directions in response to a strain generated in said shaft;

a sensing coil disposed in spaced, facing relation to said magnetic layers;

an AC exciting circuit for applying an AC exciting voltage across said sensing coil;

a pair of differential amplifier circuits for sensing the voltage difference between the mid point and the two ends of said sensing coil;

an adder circuit for summing the outputs from said differential amplifier circuits;

a first phase detector for phase detecting the output of said adder circuit, using a phase detection signal which is in synchronization with positive-going portions of said AC exciting voltage of said AC exciting circuit;

a second phase detector for phase detecting the output of said adder circuit, using a phase detection signal which is in synchronization with negative-going portions of said AC exciting voltage of said AC exciting circuit; and a further differential amplifier circuit for differentially amplifying the outputs of said first and second phase detector circuits.

* * * * *